United States Patent [19]

Harris

[11] 4,420,143

[45] Dec. 13, 1983

[54] LINE STRING BLOCK ATTACHMENT

[76] Inventor: William J. Harris, Rte. 1, Box 245, Russell, N.Y. 13684

[21] Appl. No.: 330,895

[22] Filed: Dec. 15, 1981

[51] Int. Cl.³ .............................................. H02G 1/02
[52] U.S. Cl. ......................................... 254/134.3 PA
[58] Field of Search ............... 254/134.3 R, 134.3 PA, 254/389, 403

[56] References Cited

U.S. PATENT DOCUMENTS

| | | | |
|---|---|---|---|
| 2,879,031 | 3/1959 | Livingston | 254/134.3 PA |
| 2,946,559 | 7/1960 | Pickett | 254/134.3 PA |
| 3,077,337 | 2/1963 | Cronkright | 254/134.3 PA |
| 3,145,973 | 8/1964 | MacFarlane | 254/134.3 PA |
| 3,584,837 | 6/1971 | Reilly et al. | 254/134.3 PA |
| 3,640,504 | 2/1972 | Lindsey | 254/134.3 PA |
| 3,720,399 | 3/1973 | Bozeman | 254/134.3 PA |
| 4,018,422 | 4/1977 | Bozeman | 254/134.3 PA |
| 4,039,141 | 8/1977 | Lindsey | 254/134.3 PA |

Primary Examiner—Frederick R. Schmidt
Assistant Examiner—Steven P. Schad
Attorney, Agent, or Firm—Blair, Brown & Kreten

[57] ABSTRACT

An attachment for single strand and multi-strand stringing blocks used during the stringing of high tension electrical wires between electrical suspension towers. Since electrical towers are not all disposed in a linear array an angled pull has a tendency to cause a lead cable to jump out of a groove in a pulley sheave on the stringing block. When in a first position roller guides on a stringing block attachment engage the lead cable and prevent it from sliding out of the groove in the pulley sheave. In a second position the rollers are retracted so they will not engage the conductor wire which follows immediately behind the lead cable. Support arms for the rollers are rotatably attached to the framework of the attachment which is mounted on the carriage of the stringing block.

9 Claims, 8 Drawing Figures

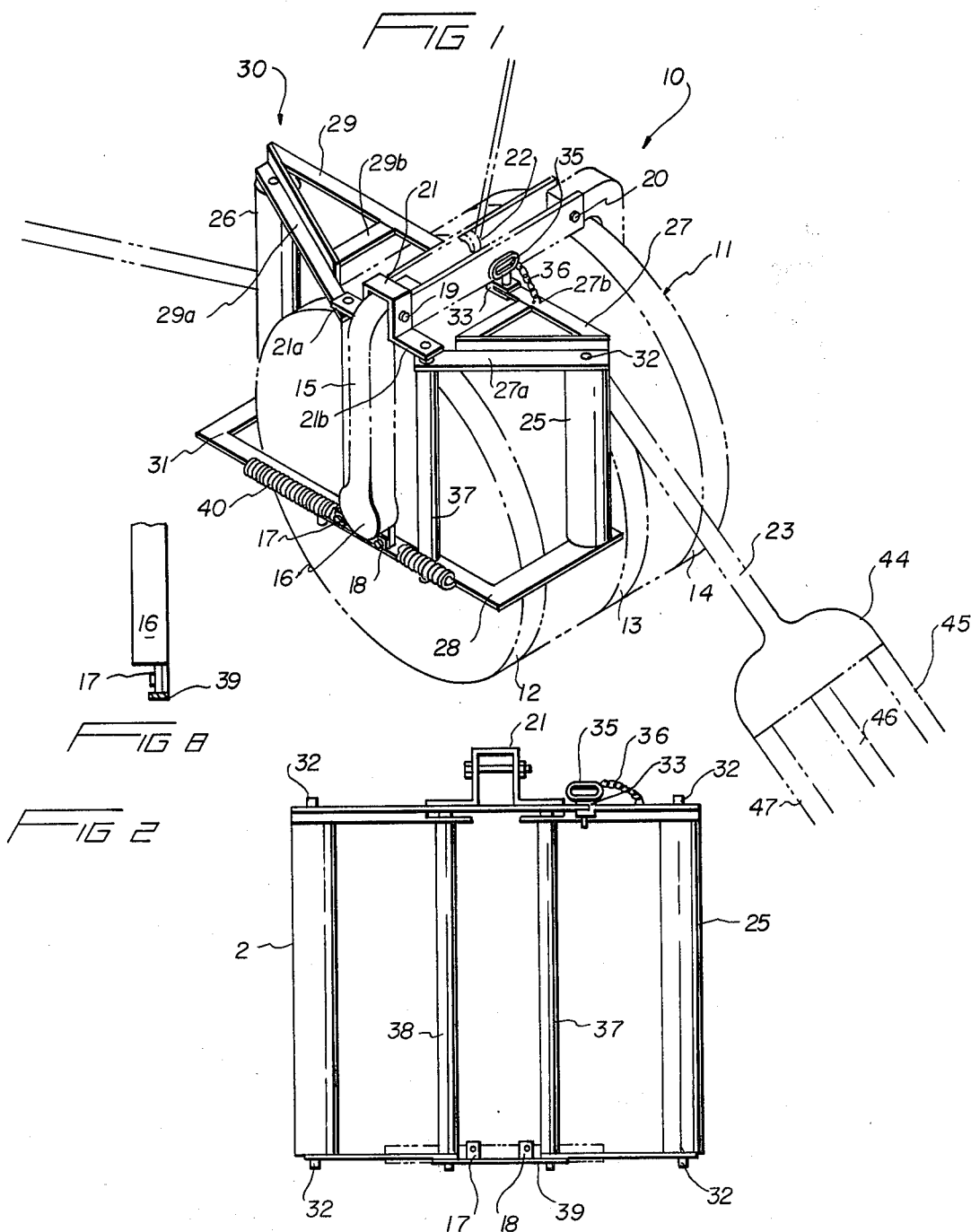

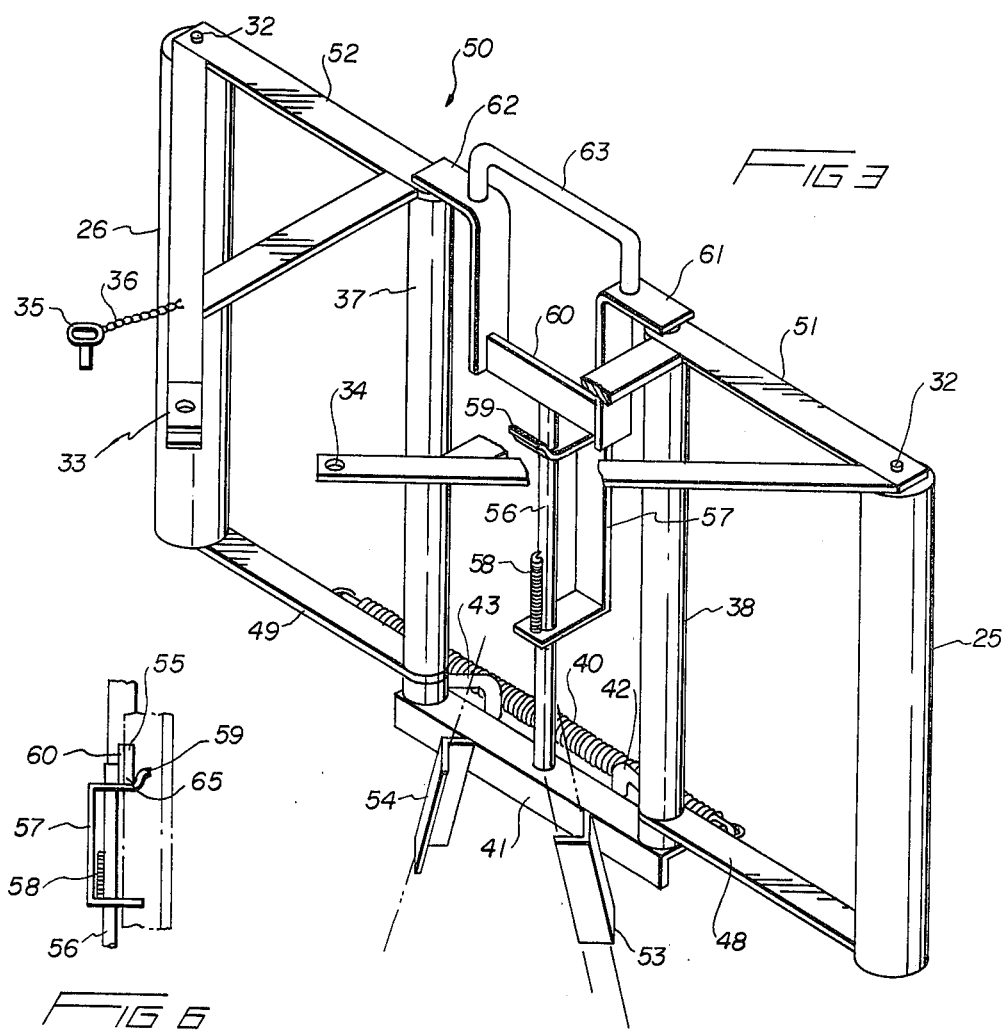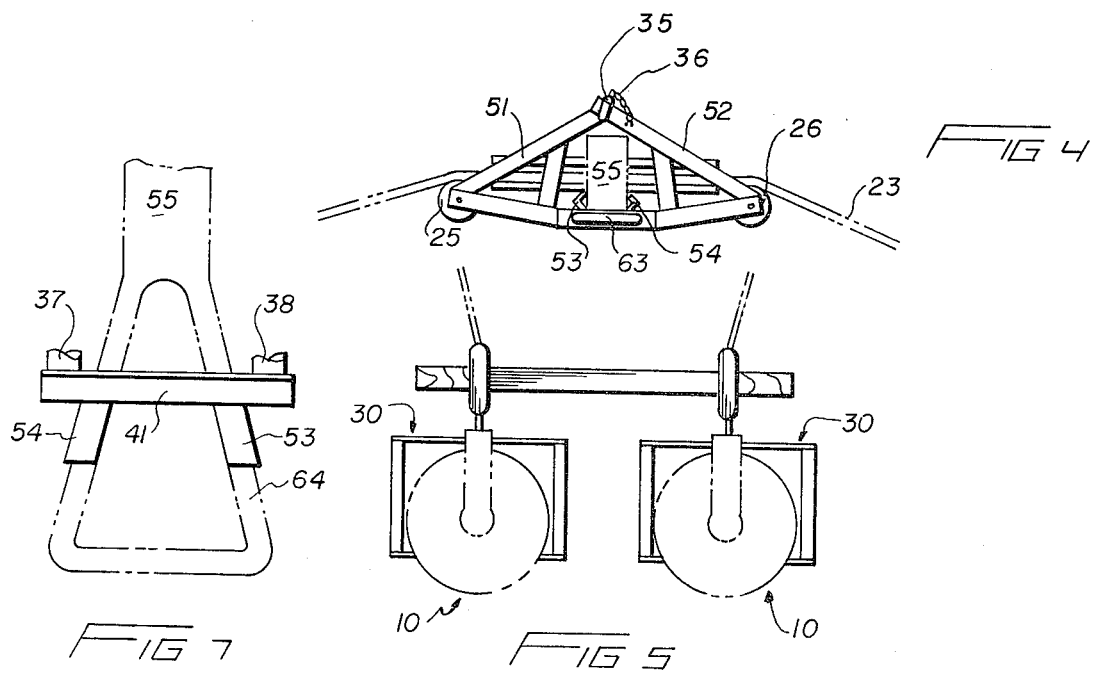

LINE STRING BLOCK ATTACHMENT

BACKGROUND OF THE INVENTION

As America's power needs grow so does the need for transferring power from the source to the consumer. This is mainly accomplished by stringing high-tension wires from the power source through a maze of electrical suspension towers and telephone poles, to the consumer. The process of stringing high-tension wires is a difficult and dangerous one. First a lead rope must be strung from tower to tower which is followed by a heavy duty steel cable. These lines are drawn through a typical block to aid in the stringing process. Once the lead cable is in place and properly tensioned it must be transferred from the block used to draw it from tower to tower to a line stringing block which will eventually guide the conductor wires. This transfer of the lead cable from one block to another is time consuming and dangerous. It is much more efficient to draw the lead cable directly over the line stringing block, however in many instances this cannot be attempted because not all successive towers are in a linear configuration. This means that the stringing process often requires pulling from an angle. This procedure has a tendency to cause the lead cable to jump out of the groove in the pulley sheave of the stringing block. In order to prevent this unfortunate and time consuming event the instant invention attaches directly to a line stringing block and guides the lead cable preventing it from jumping off the block during an angle pull. This allows the line stringing block to be used in the first instance, thus eliminating the need for transferring the lead cable from one block to another. The inherent efficiency of this process as compared to the other combined with the added safety factors, betokens a strong felt yet unfulfilled need for the attachment according to the instant application.

Once the lead cable is strung it serves as a tag line for the conductor wire or wires. Tension is still maintained so that the conductor wires do not carry slack which will cause them to come in contact with the ground. The conductor wires must be handled with care to prevent any damage. The conductor wires are attached to a running board at the end of the lead cable. The roller guides in the instant invention are allowed to contact the lead cable as it is being strung, however the rollers must be retracted when the conductor wires approach to insure that no damage is incurred to the conductor wires. The instant invention is retractable so that the rollers can be withdrawn from the engaging position by releasing a pin which allows the rollers to swing out of the way to a ready position. Thus the entire stringing process is made more efficient by the elimination of unnecessary steps.

The following U.S. patents reflect the state of the art of which applicant is aware, in so far as these references appear germane to the patent process: Nos.

2,879,031: Livingston
3,077,337: Cronkright
3,145,973: MacFarlane
3,584,837: Reilly
3,720,399: Bozeman
4,039,141: Lindsey Of these references, the patent to MacFarlane is closest to the instant invention, because he teaches the use of a line stringing block that includes a lead cable guide means for line stringing blocks, which will guide the running board into the stringing block in proper alignment for passing therethrough and which will automatically spring out of the path of the running board as it enters the stringing block. MacFarlane teaches the use of rollers contained on shafts affixed to brackets arranged in opposed overlapping relationship.

The instant invention distinguishes thereover in that it pivots from a first to a second position when actuated manually. This allows the operator to determine the most advantageous moment to disengage the roller guides from the lead cable. The instant invention is further distinguished in that it may be applied in alternate embodiments to a single strand stringing block or a multiple strand stringing block.

MacFarlane teaches the use of four rollers through which the lead cable must be threaded. The instant invention accomplishes a similar task with but two rollers requiring no threading of the lead cable. The release of the rollers in MacFarlane requires the impact of the running board on the rollers to push them forward before they rotate to a neutral position. Therefore any forward force on the MacFarlane rollers can release them prematurely. The lead cable often carries tensions exceeding 5,000 lbs and it must often be drawn through the stringing block at an angle. This causes the stringing block to agitate and rotate as much as 90° from its original, unloaded, hanging position and puts a great deal of strain on the rollers. During an angle pull a forward force is applied to the rollers which in the case of MacFarlane would trip the releasing mechanism for the rollers at an inappropriate time. This problem is overcome in the instant invention because the rollers are locked in position until the operator decides to release them.

Furthermore, the direction in which the lead cable tends to migrate on the stringing block is predetermined by the angle from which the lead cable is pulled. Also, the maximum angle at which the lead cable can be pulled through the stringing block is set forth in the specifications provided by the wire manufacturers or the power company. If the angle is to severe, then a pair of stringing blocks are used in tandem in conjunction with a spreader bar. Since the stringing angle is known beforehand by the alignment of the suspension towers and the specifications, only one pair of guide rollers need be applied to the appropriate side of the stringing block. The instant invention mounts easily to either side of the stringing block, thus adapting for any angle pull.

The other references further define the state of the art.

SUMMARY AND OBJECTS OF THE INVENTION

Accordingly, a primary object of this invention is to provide a novel apparatus which wil attach to a stringing block and engage the lead cable with a pair of opposed rollers to insure that the lead cable remains properly situated in the groove in the pulley sheave even during the most severe angle pull.

It is another object of this invention to provide a novel attachment for a stringing block which is easily mounted to either single strand or multiple strand stringing blocks.

A further object of this invention is to provide a new stringing block attachment which in its first position engages and guides the lead cable and in its second position disengages the lead cable and retracts to such a position that it will neither interfere with nor foul the running board which carries with it the conductor wires.

It is a still further object of the instant invention to provide a novel stringing block attachment which readily shifts from a first engaged position to a second disengaged position by the simple removal of a clevis pin.

It is another object of the instant invention to reduce the cost and danger involved in stringing high-tension wires by providing an apparatus which allows the stringing process to occur using the regular line stringing block instead of an alternate block which is frequently required during the difficult angled pull.

The objects stated above and other related objects are accomplished by the provision of an easily mounted attachment to a stringing block consisting of a centrally located mounting framework on either side of which are rotatably disposed two support arms containing roller guides. The support arms lock together in a first position which places the two roller guides proximate to and on opposing sides of the pulley sheave which is integral to the stringing block. The roller guides engage the lead cable just before and just after it passes through the stringing block. This essential guidance insures that the lead cable will not slip from the groove in the pulley sheave for which it was intended and thereafter foul in the stringing block. In the second position the support arms are easily unlocked from one another and retract to a position which allows the conductor wires to pass through the line stringing block without interference or damage from the roller guide.

Other objects and advantages will become apparent when viewed in the light of the following specification in conjunction with the accompanying drawings.

BRIEF DESCRIPTION OF THE DRAWING FIGURES

FIG. 1 is a perspective view of a multi-strand stringing block with the attachment mounted in its first engaged position;

FIG. 2 is a rear view of the stringing block attachment;

FIG. 3 is a perspective view of the single strand embodiment of the instant invention;

FIG. 4 is a top view of the single strand embodiment of the present invention;

FIG. 5 depicts the use of tandem stringing blocks for difficult angled pulls;

FIG. 6 is a partial side view of the upper mounting bracket as it would appear when engaged with the carriage of the stringing block of FIG. 3;

FIG. 7 is a partial front view showing the engagement of the bottom mounting angle irons with the struts of the carriage of the stringing block shown in FIG. 3; and FIG. 8 is a side view of a lower portion of the block shown in FIG. 1.

DESCRIPTION OF THE PREFERRED EMBODIMENT

Referring now to the drawings in detail wherein like reference numerals represent like parts throughout the drawings, FIG. 1 shows the instant invention applied to a stringing block. Reference numeral 10 refers generally to the stringing block which is essentially a large pulley.

The stringing block 10 consists of a sheave 11 with three grooves 12, 13 and 14 which will receive the conducting wires. The stringing block carriage 15 is a substantially U-shaped framework which captures either end of the stringing axle in a hub 16. Provided on the hub 16 are two mounting tabs which register with two similar lower mounting tabs 17 and 18 on the instant invention. The stringing block carriage 15 is bolted together on the top in two locations 19 and 20. Either one of these locations 19 and 20 will register with the upper mounting bracket 21 of applicant's attachment. The upper mounting bracket 21 is substantially an inverted U-shaped plate with two lateral flanges 21(a) and 21(b) used to mount and support the two support arm axles 37 and 38. Used in combination the lower mounting tabs 17 and 18 and the upper mounting bracket 21 attach this embodiment of the invention to a multiple strand stringing block such as that pictured FIG. 1. The stringing block 10 is further provided with a suspension eye 22 for easy installation.

Once the stringing block attachment, generally referred to as reference numeral 30, is bolted in place it is ready to perform its function. As the lead cable 23 is tensioned over the stringing block 10 it may have a tendency to slip out of the groove 13 in the sheave 11, especially when tensioning requires an angled pull. The roller guides 25, 26 prevent the lead cable 23 from fouling in the stringing block 10. The right roller guide 25 is disposed on an axle 32 which is supported between the upper right support arm 27 and the lower right support arm 28. The upper right support arm 27 consists of three members 27, 27(a) and 27(b) which form a triangular support web. Member 27(a) is an angle iron to add strength. Member 27(b) is a bracing member appearing for the same purpose. The lower right support arm 28 is an L-shaped bar. Similarly, the left roller guide 26 is supported and positioned between the upper left support arm 29 and its associated members 29(a) and 29(b) and the lower left support arm 31. The upper and lower right support arms are pivotally mounted on an axle 37 which is supported between the upper mounting bracket 21 and the lower tang 39. Similarly, the left support arms 29, 31 are pivotally mounted on an axle 38 which is also supported between the upper mounting bracket 21 and the lower tang 39. In the operational mode the upper support arms 27 and 29 are linked together by means of a clevis 33 appearing in the right arm 27 and an eye 34 appearing in the left arm 29 which registers with the clevis 33. In the first position the arms 27 and 29 are locked together by a clevis pin 35 which is attached to the right arm 27 by a retention chain 36. This clevis arrangement is best shown in FIG. 3. It should also be noted that the clevis arrangement is not centrally located but is offset to the right side so that the clevis pin 35 can be installed or removed without any interference from the stringing block carriage 15.

Thus, when the clevis pin 35 is removed a return spring 40 attached between the lower support arms 28, 31 causes the support arms to pivot about their respective axles 37, 38 and thereby retract the roller guides 25, 26 from their operative first position proximate to the lead cable 23 and return them to their retracted second position as determined by the support arm stops 42, and 43, as best shown in FIG. 3. This is an extremely important feature because the roller guides 25 and 26 must be in the operative mode while stringing and tensioning the lead cable 23, but the rollers must be retracted and out of the way as the running board 44 carrying with it the three conductor wires 45, 46 and 47 approaches the stringing block 10. As the running board 44 passes over the stringing block 10 the conductor wires 45, 46 and 47 are fed into the appropriate grooves 12, 13 and 14 on the pulley sheave 11 of the stringing block 10. All this is accomplished with a great deal of tension on the lead cable 23 so that the conductor wires 45, 46 and 47 do not touch the ground during the stringing process. In order for this to be accomplished the roller guides 25 and 26 must be retracted at the proper time without losing any tension on the lead cable 23. Thus in operation, when the running board 44 nears the stringing block 10 the clevis pin 35 is withdrawn and the roller guides 25, 26 along with their associated support arms 27, 28, 29, 31 retract to a position where they do not interfere with the orderly passage of the running board 44 and the conductor wires 45, 46, 47 over the stringing block 10.

Quite often successive power line towers or poles are not in a linear array therefore the stringing process requires an angular pull. Disengagement of the lead cable 23 from the sheave groove 13 is most likely to occur during initiation of an angular pull. This is when the instant invention is most valuable. When the the successive towers or poles change direction substantially, a pair of stringing blocks 10 can be used in tandem as shown in FIG. 5. This configuration allows a more radical change in the path of the conductors wires.

Thus far the applicant has described the preferred embodiment of the instant invention as it is attached to a multiple strand stringing block. A second preferred embodiment of the instant invention, as shown in FIG. 3, is intended to be attached to single strand stringing blocks. This embodiment functions the same as and is substantially similar to the first embodiment. The major differences are the manner in which the attachment mounts to the stringing block and the configuration of the lower support arms 48, 49. In the description of this embodiment it should be recalled that like reference numerals refer to like parts thoughout the several figures.

Reference numeral 50 FIG. 3 refers generally to the single strand embodiment of the instant invention. In this configuration the lower support arms 48, 49 are substantially linear, whereas previously the lower support arms 28 and 31 were substantially L-shaped. The upper support arms 51 and 52 are triangulated as were the others 27, 29 in FIG. 1, however, the configuration and construction of the triangle is somewhat different. Similar to the previous embodiment the support arms 51 and 52 are linked together by means of a locking clevis arrangement 33. The roller guides 25 and 26 along with the support arm axles 37 and 38 are the same as in the previous embodiment.

The bottom mounting angle irons 53 and 54 engage the struts 64 of the single stringing block carriage frame 55. This is shown in a side view in FIG. 7 and a top view in FIG. 4. The two mounting angle irons 53 and 54 are welded to an angle iron tang 41 which on either end supports the support arm axles 37 and 38 and in the center, supports the mounting shaft 56 for the upper mounting bracket 57. The upper mounting bracket 57 is a substantially C-shaped bar which is slidably disposed on the shaft 56 and upwardly biased by a spring 58. The locking tab 59 of the mounting bracket 57 engages a lip 65 on the stringing block carriage 55 in a position above where the angle irons 53, 54 engage the stringing block carriage struts 64. This is accomplished by pressing the mounting bracket 57 downward on the mounting shaft 56 against the spring 58 until the locking tab 59 is in such a position that it can slip into and engage the lip 65 of the stringing block carriage 55. After this is accomplished the mounting bracket 57 is released and the spring 58 forces the locking tab 59 to remain secured in the engaged position. This arrangement is best depicted in FIG. 6. The upper portion of the mounting shaft 56 is affixed to a backing plate 60 which is supported between two inverted L-shaped handle brackets 61 and 62. The backing plate 60 works in conjunction with the locking tab 59 by abutting against the stringing block carriage 55, as shown in FIG. 6. A handle 63 is supported by and between the upper surfaces of the two handle mounting brackets 61 and 62. The handle mounting brackets 61 and 62 also support the upper extremities of the support arm axles 37 and 38.

In operation the single strand embodiment of the instant invention functions the same as the multi-strand embodiment. When locked in the first position by the clevis pin 35, the roller guides 25 and 26 engage and help direct the stringing of the lead cable 23. Similarly, in the second position with the clevis pin 35 released, the support arms along with their associated roller guides 25, 26 retract into a position which will not interfere with any ongoing stringing requirements.

Having thus described the invention, it should be apparent that numerous structural modifications are contemplated as being a part of this invention as set forth hereinabove and defined hereinbelow by the claims.

What I claim is:

1. An attachment for a stringing block or the like for guiding cable on a block sheave when preceeding or successive cable towers or poles are not linearly aligned comprising in combination:
    means on said attachment affixed to a carriage of the stringing block for supporting said attachment,
    said attachment including first and second positions,
    said first position oriented to engage, guide and constrain the cable and having manually activated locking means to maintain said first position,
    said second position oriented to be retracted from the cable,
    and biasing means to move said attachment from said first position to said second position upon release of said manual locking means whereafter the stringing block supports the cable solely,
    a first cable engaging surface formed as an elongate roller rotatably mounted on a roller axle which forms a portion of said attachment, said roller rotates in a fixed radius arc from said first to said second position,
    and a lower and upper support arm on said roller axle at extremities thereof, said support arms connected to a further axle for synchronous movement of said support arms, said further axle connected to an upper mounting bracket supported on said carriage and to a tang on a lower carriage portion, said biasing means connected to said lower support arm, said support arms connected to the stringing block whereby motion of said attachment from said first position to said second position causes rotation of said upper and lower support arms about an arc of a circle relative to the area of attachment to the stringing block as the center of curvature, and said roller and roller axle move in a peripheral path about said support arms defining and generating a cylinder.

2. The attachment of claim 1 incuding a second cable engaging surface diametrically spaced from said first cable engaging surface and similarly provided with upper and lower support arms interconnecting extremities of a roller axle which supports a roller thereon, said support arms adapted to move in an arcuate path about a fixed center which is attached to the stringing block, said support arms causing said rollers and roller axle to move about termini of said support arms so as to generate a cylindrical surface.

3. The attachment of claim 2 wherein said locking means includes an arm extending from each said roller axle one said arm having a clevis fastener at an and thereof, the other said arm having an eyed end for registry and locking engagment with said clevis fastener via a clevis pin disposed therethrough.

4. An attachment for a stringing block or the like for guiding cable on a block sheave when preceeding or succesive cable towers or poles are not linearly aligned comprising in combination:
 means on said attachment affixed to a carriage of the stringing block for supporting said attachment, said attachment including first and second positions;
 said first position oriented to engage, guide and constrain the cable and having manually activated locking means to maintain said first position,
 said second position oriented to be retracted from the cable,
 and biasing means to move said attachment from said first position to said second position upon release of said manual locking means whereafter the stringing block supports the cable solely, one cable engaging surface oriented in said first position tangentially proximate to a sheave groove which carries the cable but offset from the groove to allow clearance for the cable in the groove, a second cable engaging surface diametrically spaced from said first cable engaging surface and tangentially proximate to the sheave groove wherein said cable engaging surfaces are formed as elongate rollers rotatably mounted on roller axles which form a portion of said attachment, said rollers rotate in a fixed radius arc from said first to said second positions, generating a cylindrical circumference, said locking means is offset from an axis of symmetry of said attachment and stringing block, said axis of symmetry defined by the carriage whereby disengagement of said locking means is not interfered with by the carriage, said locking means includes an arm extending from each said roller axle one said arm having a clevis fastener at an end thereof, the other said arm having an eyed end for registry and locking engagement with said clevis fastener via a clevis pin disposed therethrough, a lower and upper support arm on said roller axle at extremities thereof, said support arms connected to further axles for synchronous movement of said support arms, said further axles connected to an upper mounting bracket supported on said carriage and to a tang on a lower carriage portion, said biasing means interconnecting said lower support arms.

5. The attachment of claim 1 including angle irons attached to said tang canted to receive struts of said carriage along a lower portion thereof, a shaft extending up from said tang, a C-shaped member having a locking tab slidably carried on said shaft and upwardly biased by a spring therebetween, said locking tab oriented to engage a lip on the carriage.

6. The attachment of claim 5 including a further arm connecting each said upper support arm and said clevis arm oriented thereby so that said three arms define a triangular brace.

7. The attachment of claim 5 wherein said lower support arms are linear and includes stop means for limiting travel of said lower support arm in said second position.

8. The attachment of claim 1 wherein said upper mounting bracket includes an inverted U shaped plate attached to the carriage and two lateral flanges supporting each said further axle on an upper portion thereof.

9. The attachment of claim 1 wherein said lower support arm is L shaped.

* * * * *